June 27, 1939.  P. BERTRAND  2,164,048
APPARATUS FOR THE DRAWING OF SHEET GLASS
Filed Sept. 27, 1937
Fig.1
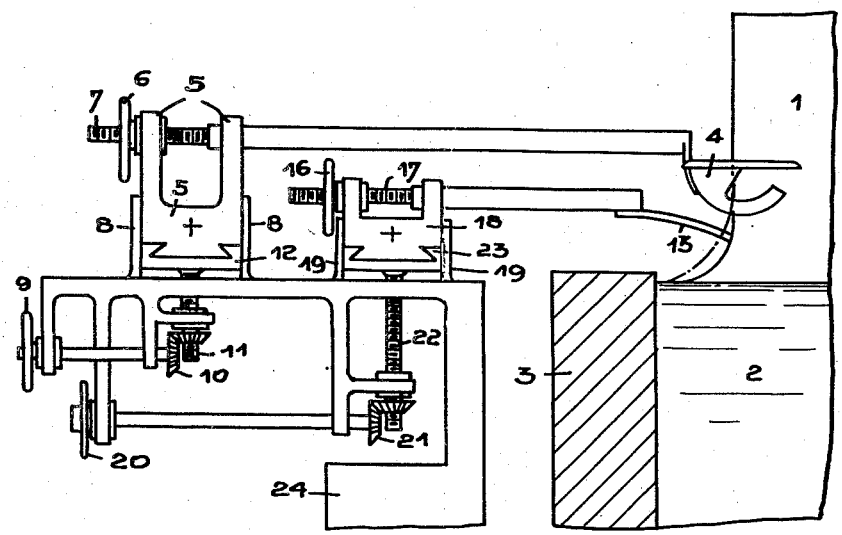
Fig.3.
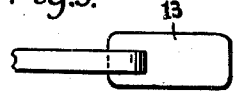
Fig.2.
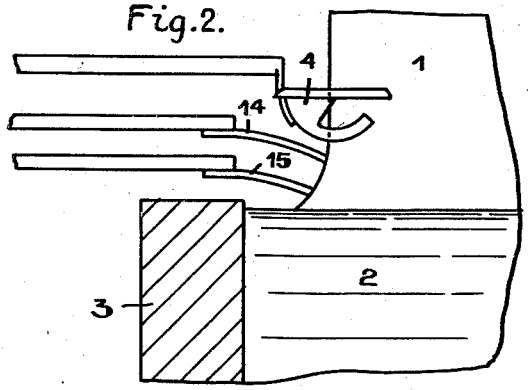
Fig.4.
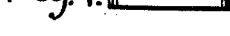
Fig.7.
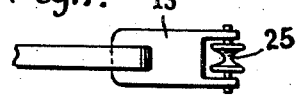
Fig.5.
Fig.8.
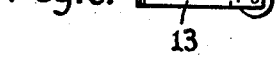
Fig.6.
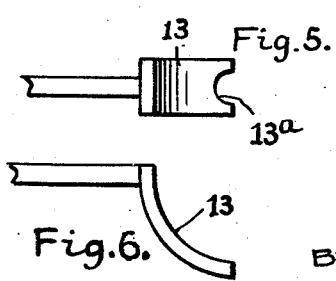
Inventor:
PIERRE BERTRAND
BY Bradley + Bu
ATTORNEYS.

Patented June 27, 1939

2,164,048

UNITED STATES PATENT OFFICE 2,164,048

APPARATUS FOR THE DRAWING OF SHEET GLASS

Pierre Bertrand, Paris, France, assignor to Pittsburgh Plate Glass Company, Pittsburgh, Pa., a corporation of Pennsylvania Application September 27, 1937, Serial No. 165,854
In France September 28, 1936

3 Claims. (Cl. 49—17)

In the processes for drawing sheet glass from the free surface of the glass, where the width of the sheet is maintained by edge maintaining devices placed outside the glass bath, it can be advantageous to draw the edges at a comparatively great distance from the tank walls. But then there is trouble with the excess of volume of the glass mass below the edge-maintaining devices. Such mass having a tendency to spread as far as the wall itself, it causes an excessive flow of glass to the edge portion of the sheet. This mass of glass below the edge maintaining devices being of too great a volume obliges said devices to work too intensively. Another trouble comes from the fact that the meniscus spreading to the tank wall pulls the sheet and causes an abrupt discontinuity in the drawing direction.

As a result of all these drawbacks, the edge is too thick as compared with the main body of the sheet, or irregular, and this might cause breakage in annealing.

The aim of the present invention is to facilitate the action of the edge maintaining devices, in other words, to limit their work by decreasing the volume of the glass mass below the edges of the sheet.

Such aim is obtained by placing one or more members acting as abutments below said edge maintaining devices but above the glass surface, such members contacting with the edge of the glass mass rising for forming the edge of the sheet.

Such member or members decrease the volume of the glass mass below the edges, on one hand by limiting the extension of the meniscus towards the wall, on the other hand by so shaping such glass mass that it will more progressively join the sheet edge in the part of same within the zone of action of the edge maintaining devices.

For locating the position of the sheet edge in the transverse direction, the shape of the end of such member is preferably semi-circular. Such member, as well as the edge maintaining devices, is adjustable in the direction of the plane of the sheet, as well horizontally as vertically and also in a direction perpendicular to the plane of said sheet.

Several apparatus are hereunder described, merely as examples for carrying out the process according to the invention.

In the accompanying drawing:

Fig. 1 is partly a section through an installation for drawing glass comprising a member acting as abutment according to the invention.

Fig. 2 is partly a section through another form of the invention wherein two members acting as abutments are used.

Figs. 3 and 4 show an alternative form of abutment member, Fig. 3 being a plan view and Fig. 4 a side elevation.

Figs. 5 and 6 show a further form of abutment member, Fig. 5 being a plan view and Fig. 6 a side elevation.

Figs. 7 and 8 show another form of abutment member, Fig. 7 being a plan view and Fig. 8 a side elevation.

The sheet 1 rises from a glass bath 2 contained in a tank, a wall of which is shown at 3.

The width of the sheet is maintained through well known edge maintaining means, for instance a bowl shown at 4.

The position of such member 4 is adjustable by means of the shown devices. The frame 5 being fixed, the member 4 can be brought forward, in a horizontal direction situated in the plane of the sheet, by means of the hand wheel 6 and the endless screw 7 placed at the end of the support of said member. The frame 5 can in its turn be vertically moved between the slides 8 by a hand wheel 9, the bevel gearing 10 and the endless screw 11, which carries a part 12 on which the frame 5 is placed in a dovetail setting. Such dovetail setting enables the frame 5 to slide perpendicularly to the plane of the sheet independently of the part 12 carried by the screw 11. Such movement can be obtained by a device (not shown) comprising a hand wheel, an endless screw and a nut set on the part 12.

Below said edge maintaining device 4 and above the glass surface is a member 13 acting as abutment, whose position in connection with the meniscus rising from the glass bath to form the sheet edges is adjusted so that it contacts with said meniscus and acts upon it as an abutment limiting the extension of the meniscus in the direction of the tank wall. For adjusting the position of the member 13, one can use an arrangement similar to the one used for controlling the member 4 as described.

The member 13 can be brought forward in an horizontal direction in the plane of the sheet by means of the hand wheel 16 and the endless screw 17 placed at the end of the support of said member. In its turn the frame 18 can be vertically moved between the slides 19 by means of the hand wheel 20, the bevel gearing 21 and the endless screw 22 which carries a part 23 on which the frame 18 is dovetail mounted. Such dovetail setting enables the frame 18 to slide perpendicularly to the plane of the sheet independently of the part 23 carried by the screw 22. Such movement can be obtained by a device (not shown) comprising a hand-wheel, and endless screw and a nut set on the part 23.

The several means for adjusting the position of the edge maintaining member 4 and of the member 13 can be carried by the same frame 24 (Fig. 1) which can itself be moved horizontally, vertically or transversely to the plane of the sheet.

As was aforesaid, instead of only one member 13, two or more members contacting with the glass meniscus rising from the glass bath can be used. Fig. 2 shows an example in which there are two such members 14 and 15 whose position can be adjusted simultaneously or separately for instance by such means as described for adjusting the member 13.

The process can be applied to any drawing system with edge maintaining devices different from those described, having a mechanical or thermal action, outside the glass bath, on the glass mass being drawn.

Figs. 3 and 4 illustrate a modified form of abutment member wherein the glass-engaging portion of the device is in the form of a flat plate 13.

In the form of abutment member shown in Figs. 5 and 6, the plate portion of the device is curved and is provided with a glass-engaging groove 13a.

In the modification shown in Figs. 7 and 8, the plate 13 carries a glass-engaging portion in the form of the roll 25, which in this instance is grooved although this is not necessarily the case.

What I claim is:

1. An apparatus for drawing sheet glass from a bath of molten glass in a drawing kiln comprising an edge maintaining device in the form of a forked non-cooled metal member located above the bath for holding the edge against inward movement, and a metal abutment member between the surface of the bath and said forked member engaging the meniscus of glass sheet drawn from the bath at its extreme edge only and adapted to limit its extension toward the wall of the kiln, the glass-engaging portions of said fork member being stationary.

2. An apparatus for drawing sheet glass from a bath of molten glass in a drawing kiln comprising an edge maintaining device in the form of a forked non-cooled metal member located above the bath for holding the edge against inward movement, and a metal abutment member between the surface of the bath and said forked member engaging the meniscus of glass sheet drawn from the bath at its extreme edge only and adapted to limit its extension toward the wall of the kiln, the glass engaging portions of both of said members being stationary.

3. An apparatus for drawing sheet glass from a bath of molten glass in a drawing kiln comprising an edge maintaining device in the form of a forked non-cooled metal member located above the bath for holding the edge against inward movement with the glass-engaging portions thereof stationary, and a metal abutment member between the surface of the bath and said forked member engaging the meniscus of the glass sheet drawn from the bath at its extreme edge only and adapted to limit its extension toward the wall of the kiln; said abutment comprising an idler roller pivoted on an axis transverse to the plane of the glass sheet.

PIERRE BERTRAND.